United States Patent [19]
Tomita

[11] Patent Number: 5,036,503
[45] Date of Patent: Jul. 30, 1991

[54] DISC RECORDING AND/OR PLAYBACK APPARATUS WITH AUTOMATIC CHANGER

[75] Inventor: Toshihiko Tomita, Tokorozawa, Japan

[73] Assignee: Pioneer Electronic Corporation, Tokyo, Japan

[21] Appl. No.: 197,273

[22] Filed: May 23, 1988

[30] Foreign Application Priority Data

Aug. 21, 1987 [JP] Japan .................... 62-207990

[51] Int. Cl.$^5$ .................... G11B 17/22; G11B 15/68
[52] U.S. Cl. .................... 369/36; 369/34; 369/39; 360/92
[58] Field of Search .................... 369/36, 34, 37, 38, 369/39; 360/92, 98.5

[56] References Cited

U.S. PATENT DOCUMENTS

| | | |
|---|---|---|
| 3,683,418 | 8/1972 | Martin . |
| 4,567,584 | 1/1986 | Kawakami .................... 369/38 |
| 4,599,716 | 7/1986 | Shimbo .................... 369/36 |
| 4,635,150 | 1/1987 | Kato et al. .................... 369/37 X |
| 4,647,989 | 3/1987 | Geddes .................... 369/34 X |
| 4,807,208 | 2/1989 | Geiget .................... 369/36 |
| 4,815,056 | 3/1989 | Toi et al. .................... 369/36 |

OTHER PUBLICATIONS

"Auditor: A Framework for High Availability of DB/DC Systems", W. Kim, 1982, *IEEE*, 76, 1982.
"Elections in a Distributed Computing System", H. Garcia-Maonima, *IEEE Trans. on Computers*, vol, C-31, No. 1, Jan. 1982.
"Hierarchical Ordering of Sequential Processes", E. W. Dijkstra, *Acta Informatica*, vol. 1, No. 2, pp. 115-138, 1971.
"Specification and Proof Techniques for Serializers", R. Atkinson et al., *Report of the MIT Artificial Intelligence Laboratory*, Cambridge, Mass., Aug. 1977.
"Monitors: An Operating System Structuring Concept", C. A. A. Hoare, *Communications of the ACM*, vol. 17, No. 10, pp. 549-557, Oct. 1974.
"Process Structuring, Synchronization, and Recovery Using Atomic Actions", D. B. Lomet, *Proc of the ACM Conf, on Language Design for Reliable Software*, SIGPLAN Notices, vol. R, No. 3, pp. 128-137, Mar. 1977.
"An Optimal Algorithm for Mutual Exclusion in Computer Networks", G. Ricart et al., *Communications of the ACM*, vol. 24, No. 1, pp. 9-17, Jan. 1981.
"Time, Clocks and the Ordering of Events in a Distributed System", L. Lamport, *Communications of the ACM*, vol, 24, No. 7, pp. 558-565, Jul. 1978.

*Primary Examiner*—Stuart S. Levy
*Assistant Examiner*—Kenneth B. Wells
*Attorney, Agent, or Firm*—Fleit, Jacobson, Cohn, Price, Holman & Stern

[57] ABSTRACT

An array of discs are stored in a storage unit, and desired discs are successively selected and taken out of the storage unit by a disc draw/feed mechanism for sequential playback. The disc draw/feed mechanism has a base movable in a direction in which the discs are arrayed in the storage unit, disc holding/reversing means mounted on the base for holding and reversing a selected disc, and position detecting means for detecting when the base has reached a position where the selected disc can be held by the disc holding/reversing means. The position detecting means comprises a positioning indicia group haing positioning indicia arranged along the direction in which the base is movable and aligned respectively with disc storage positions in the storage unit, an absolute address code group disposed parallel to the positioning indicia group and indicating addresses of the positioning indicia, reading means for reading the absolute address code group, and two detectors for detecting the positioning indicia, respectively for non-reversed and reversed conditions of the disc holding/reversing means. This arrangement can compensate for a displacement or deviation of a disc holding body produced with respect to the base when the disc holding/reversing means is reversed or turned around.

12 Claims, 10 Drawing Sheets

DISC RECORDING AND/OR PLAYBACK APPARATUS WITH AUTOMATIC CHANGER

BACKGROUND OF THE INVENTION (1) Field of the Invention

The present invention relates to a disc recording and/or playback apparatus, and more particularly to a disc recording and/or playback apparatus with an automatic changer capable of storing a plurality of discs, each of which may be contained within a cartridge but simply referred to as a "disc" even in that case hereinafter, and automatically selecting desired discs for sequential recording and/or playback operation.

(2) Description of the Prior Art

Figure 1:
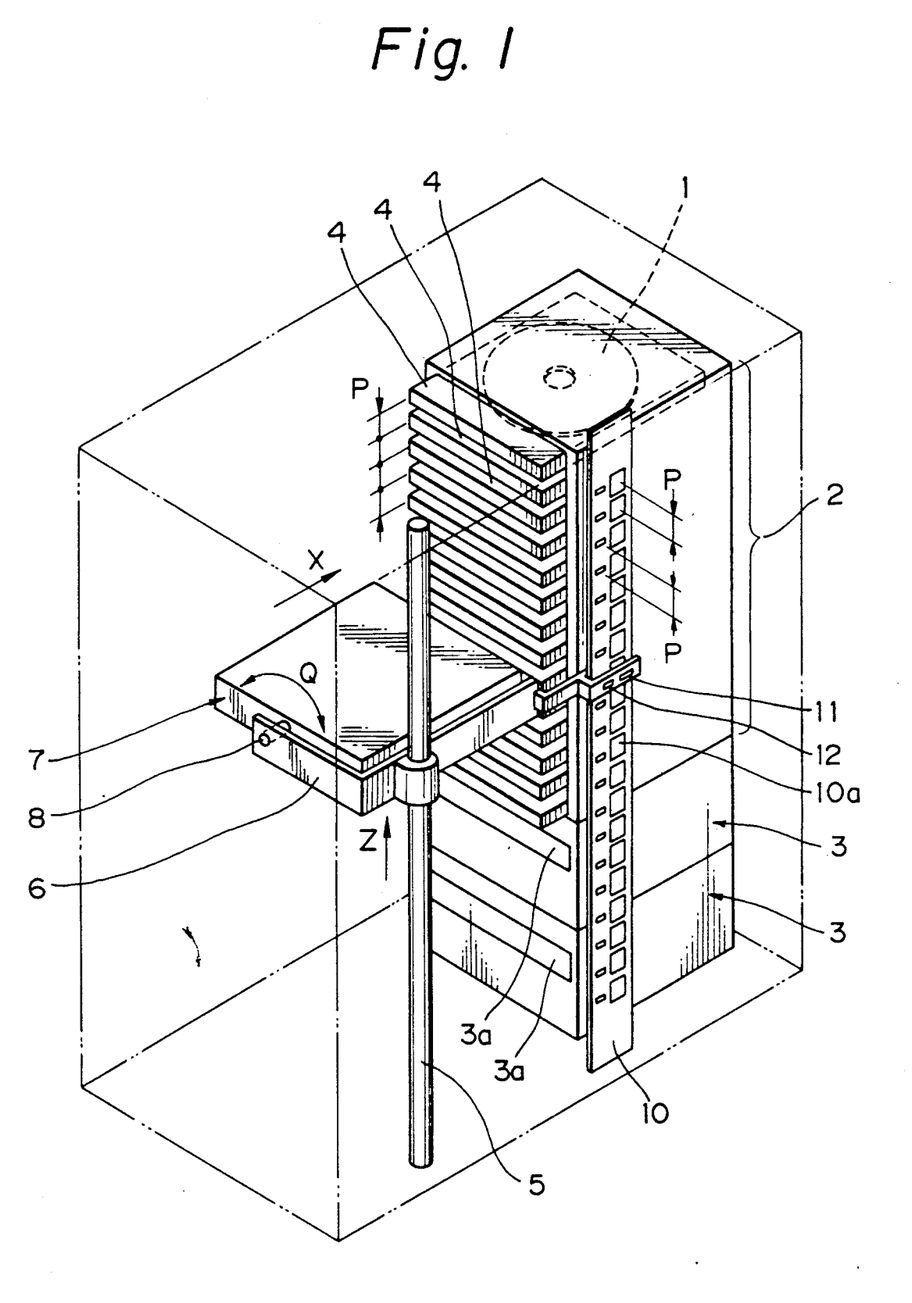
FIGS. 1 and 2 are views of a conventional disk playback apparatus with an automatic changer.

There have been developed various disc recording and/or playback apparatus with automatic changer devices for recording information on and/or playing back a plurality of discs in sequence. Basically, as shown in FIG. 1 of the accompanying drawings, such a disc recording and/or playback apparatus (simply referred to as a playback apparatus hereinafter) with automatic changer has a storage unit 2 for storing a plurality of discs 1 at a pitch P, two disc process means 3 each including a turntable and recording and/or pickup units, and a disk draw/feed mechanism (described later) for successively selecting desired discs from the storage unit 2 and feeding them, one at a time, onto the turntable, and for returning such discs, one at a time, from the disc process means into the storage unit 2. Each of the discs 1 is rotatably housed in a flat rectangular cartridge 4, and delivered onto the turntable for recording and/or playback while being housed in the cartridge 4. The two disc process means 3 are stacked one on the other below the storage unit 2. Each of the playback means 3 has a slot 3a defined in its housing for inserting a cartridge 4 with a disc 1 therein.

A guide shaft 5 extends along the array of the discs in the storage unit 2 in the direction of the arrow z, and a base 6 is slidably mounted on the guide shaft 5. A hollow rectangular rotatable body 7 is mounted on the base 6 by a spindle 8, the body 7 being rotatable about the spindle 8 in the direction of the arrow Q. Although not shown, the apparatus also includes a driving means for moving the base 6, and a rotating means for rotating the rotatable body 7. In the rotatable body 7, there are disposed gripper arms (not shown) for gripping each cartridge 4, the gripper arms being reciprocally movable in directions (the direction of the arrow X and the direction opposite thereto) normal to the direction in which the discs are arrayed. The apparatus also includes a gripping force imparting means (not shown) for imparting a gripping force to the gripper arms, and a driving means (not shown) for moving the gripper arms.

An address plate 10 is disposed alongside of the storage unit 2 and extends along the array of the discs. The address plate 10 has an absolute address slit group comprising a plurality of slits 10a positionally corresponding to the respective disc storage positions in the storage unit 2 in which the discs 1 are stored, respectively, and a positioning slit group comprising a plurality of slits 10b positionally corresponding to the respective discs 1 stored in the disc storage positions. To the base 6, there are attached a photosensor 11 for detecting the absolute address slit group and a photosensor 12 for detecting the positioning slit group.

When a disc to be played back is specified, the base 6 is moved to a position where the gripper arm can grip the cartridge 4 which stores the specified disc. At this time, the absolute address slit group and the photosensor 11 detect when the base 6 has arrived near that position, and the positioning slit group and the photosensor 12 detect when the base 6 is exactly positioned at that position.

Figure 2:
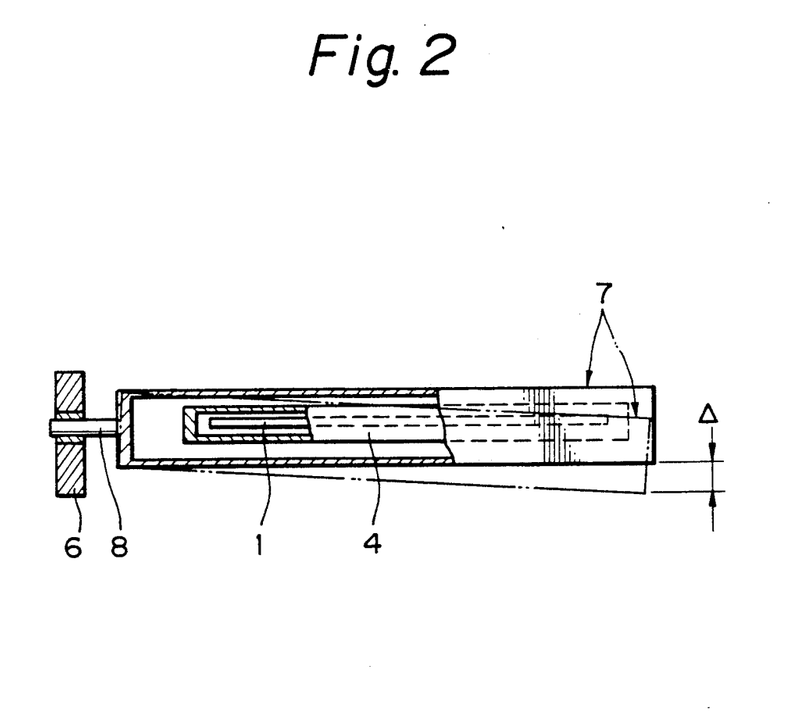

In the disc playback apparatus shown in FIG. 1, when the rotatable body 7 is reversed or turned around for playing back both sides of the disc 1, the free end of the rotatable body 7 tends to be displaced by an offset $\Delta$, as shown in FIG. 2, due for example to an error in parallelism between the rotatable body 7 and the spindle 8 and dimensional errors of various parts. The absolute address slit group and the positioning slit group, and the photosensors 11, 12 are relatively positioned such that the position of the rotatable body 7 with one side, e.g., "side A", of the disc 1 facing upwardly, i.e., the position of the rotatable body 7 indicated by the solid lines in FIG. 2 will be aligned with each cartridge storage position in the storage unit 2. Even with such a positional setting, however, if the offset or deviation $\Delta$ is large, the cartridge 4 may not be transferred between the rotatable body 7 and the storage unit 2 when the rotatable body 7 is turned upside down for playing back the side B of the disc 1. Therefore, the dimensional and assembling accuracy of the parts of the mechanism for feeding the discs has to be high in the conventional disc playback apparatus in order to minimize the deviation $\Delta$. As a result, the conventional disc playback apparatus has been costly to manufacture.

SUMMARY OF THE INVENTION

In view of the aforesaid problem of the conventional disc playback apparatus with an automatic changer, it is an object of the present invention to provide a disc playback apparatus with an automatic changer, including a less costly mechanism for feeding discs.

According to the present invention, a disc playback apparatus with an automatic changer includes a disc pickup/feed mechanism having a base movable in a direction in which discs are arrayed in a storage unit, disc holding/reversing means mounted on the base for movement in a direction substantially normal to the direction in which the discs are arrayed, for holding and reversing a selected disc with gripper arms, and position detecting means for detecting when the base has reached a position where the selected disc can be held by the disc holding/reversing means, the position detecting means comprising a positioning indicia group having positioning indicia arranged along the direction in which the base is movable and aligned respectively with disc storage positions in the storage unit, an absolute address code group disposed parallel to the positioning indicia group and indicating addresses of the positioning indicia, reading means for reading the absolute address code group, and detecting means for detecting the positioning indicia, the detecting means comprising two detectors disposed respectively for non-reversed and reversed conditions of the disc gripping/reversing means.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A disc playback apparatus with an automatic changer according to the present invention will be described below. In the disc playback apparatus, each disc is rotatably housed in a flat rectangular protective cartridge, and played back while being stored in the cartridge.

Figure 3:
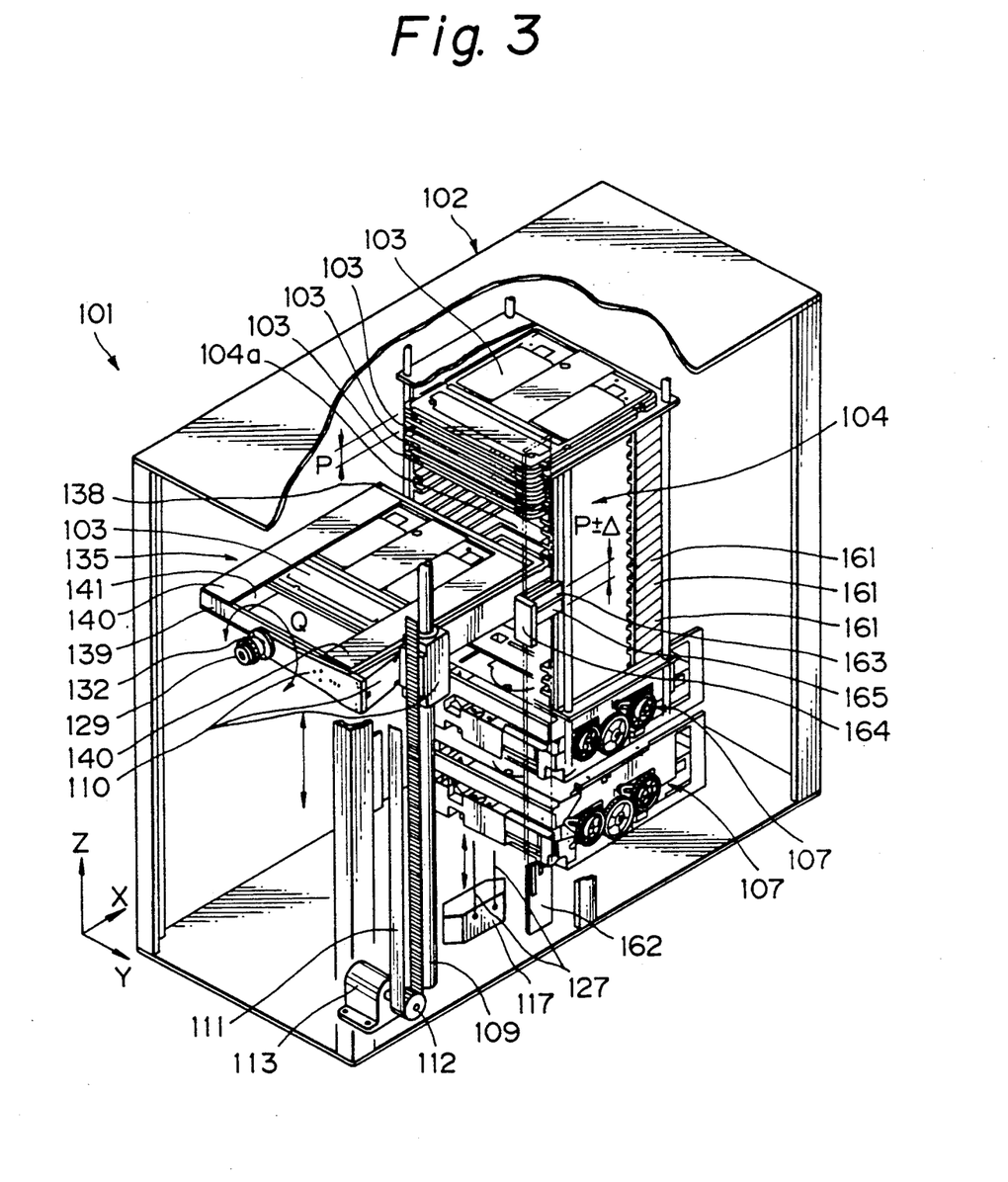
FIG. 3 is a perspective view of an internal structure of a disk playback apparatus with an automatic changer according to the present invention.

FIG. 3 shows the disc playback apparatus with an automatic changer, which is generally designated by the reference numeral 101.

As shown in FIG. 3, the disc playback apparatus has a housing 102 in the form of a rectangular parallelepiped. In FIG. 3, the arrow Y indicates a front side of the apparatus, the arrow X a lefthand side of the apparatus, and the arrow Z an upper side of the apparatus. The housing 102 houses therein a storage rack 104 serving as a storage unit for storing a plurality of rectangular cartridges 103 at a constant pitch P, each cartridge 103 holding a rotatable disc to be played back. The cartridges 103 are arrayed vertically (in the direction of the arrow Z.

Two discs process means 107, stacked one on the other, are disposed below the storage rack 104, each including a turntable and recording and/or pickup unit for processing a disc. Each of the disc process means 107 may be substantially the same as proposed in Japanese Patent Application No. 61-165792, for example, filed by the applicant, and will not be described in detail.

Discs stored in the storage rack 104, i.e., cartridges 103 are sequentially selected and fed to the disc process means 107, or returned from the disc process means 107 into the storage rack 104, by a disc draw/feed mechanism.

The disc draw/feed mechanism will now be described below.

A guide shaft 109 extends vertically in the direction in which the cartridges are arrayed in the storage rack 104. A base 110 is slidably mounted on the guide shaft 109. The base 110 can be slidably moved along the guide shaft 109 by a base driving means comprising a toothed belt 111, pulleys 112 (one shown), and a motor 113.

A counterweight 117 as a vertically movable body is disposed near the guide shaft 109, and is guided by another guide shaft (not shown).

To the counterweight 117, there are connected to ends of two wires 127 with their other ends connected to the base 110 through pulleys (not shown) disposed near the upper end of the guide shaft 109. Therefore, the counterweight 117 is guided by the other guide shaft (not shown) to move relatively to the base 110 when the base 110 is moved.

Figure 4:
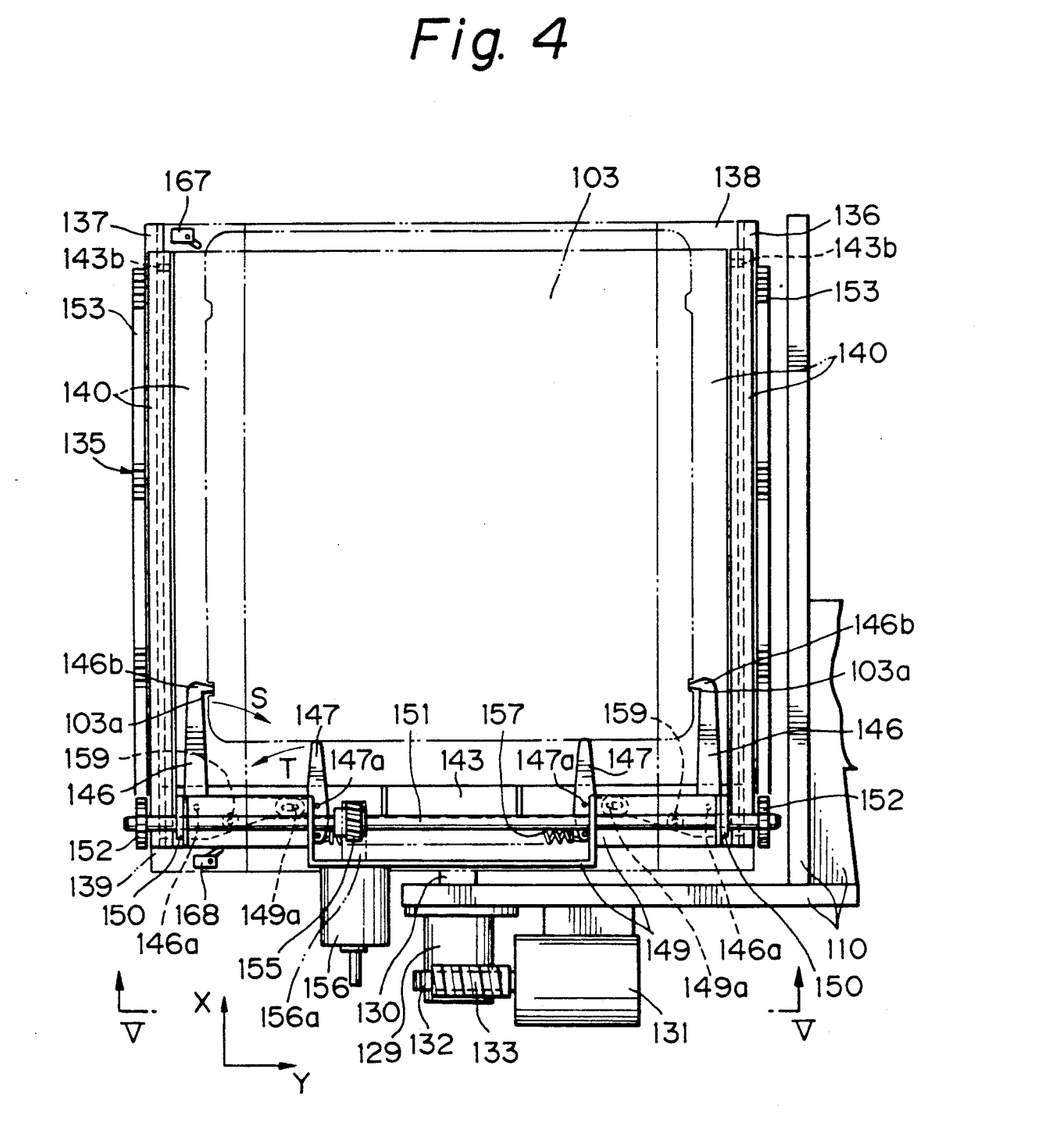
FIG. 4 is a plan view of a rotatable body.

As illustrated in FIGS. 3 and 4, a spindle 130 extending to the left (in the direction of the arrow X) is rotatably mounted by a bearing 129 from the righthand end of the base 110 which is vertically guided by the guide shaft 109. As shown in FIG. 4, a motor 131 for rotating the spindle 130 is mounted on the base 110. More specifically, a worm wheel 132 is disposed for rotation with the spindle 130, and a worm 133 fitted over the output shaft of the motor 131 is held in mesh with the worm wheel 132.

Figure 5:
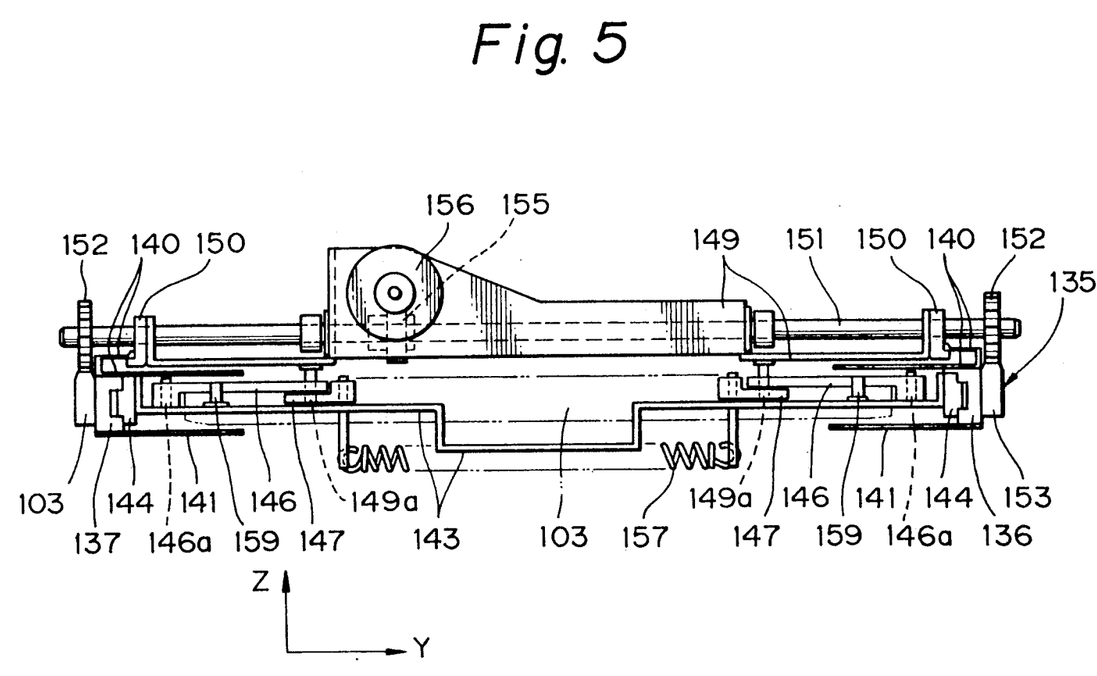
FIG. 5 is a view taken along line V—V of FIG. 4.
Figure 6:
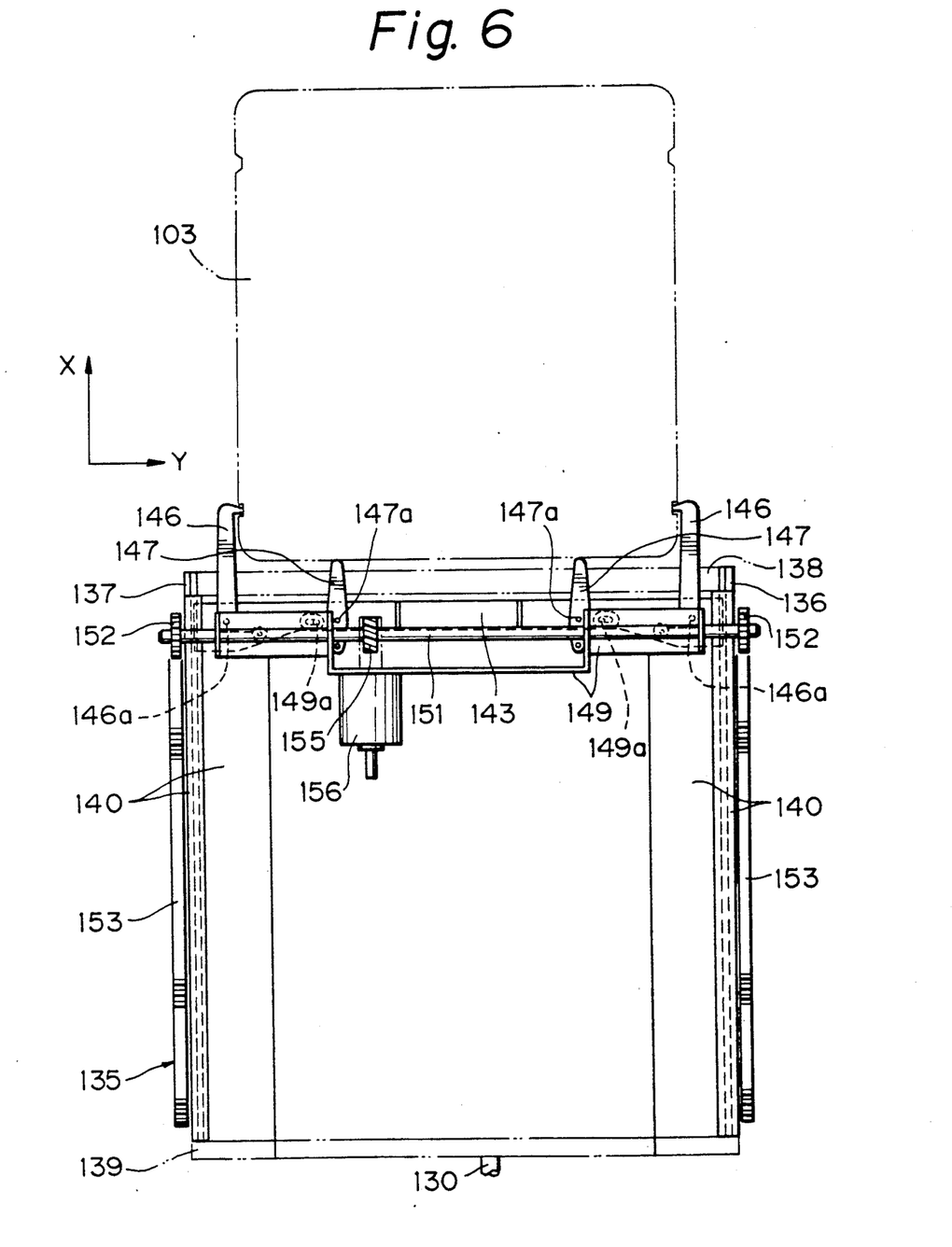
FIG. 6 is a plan view of the rotatable body.
Figure 7:
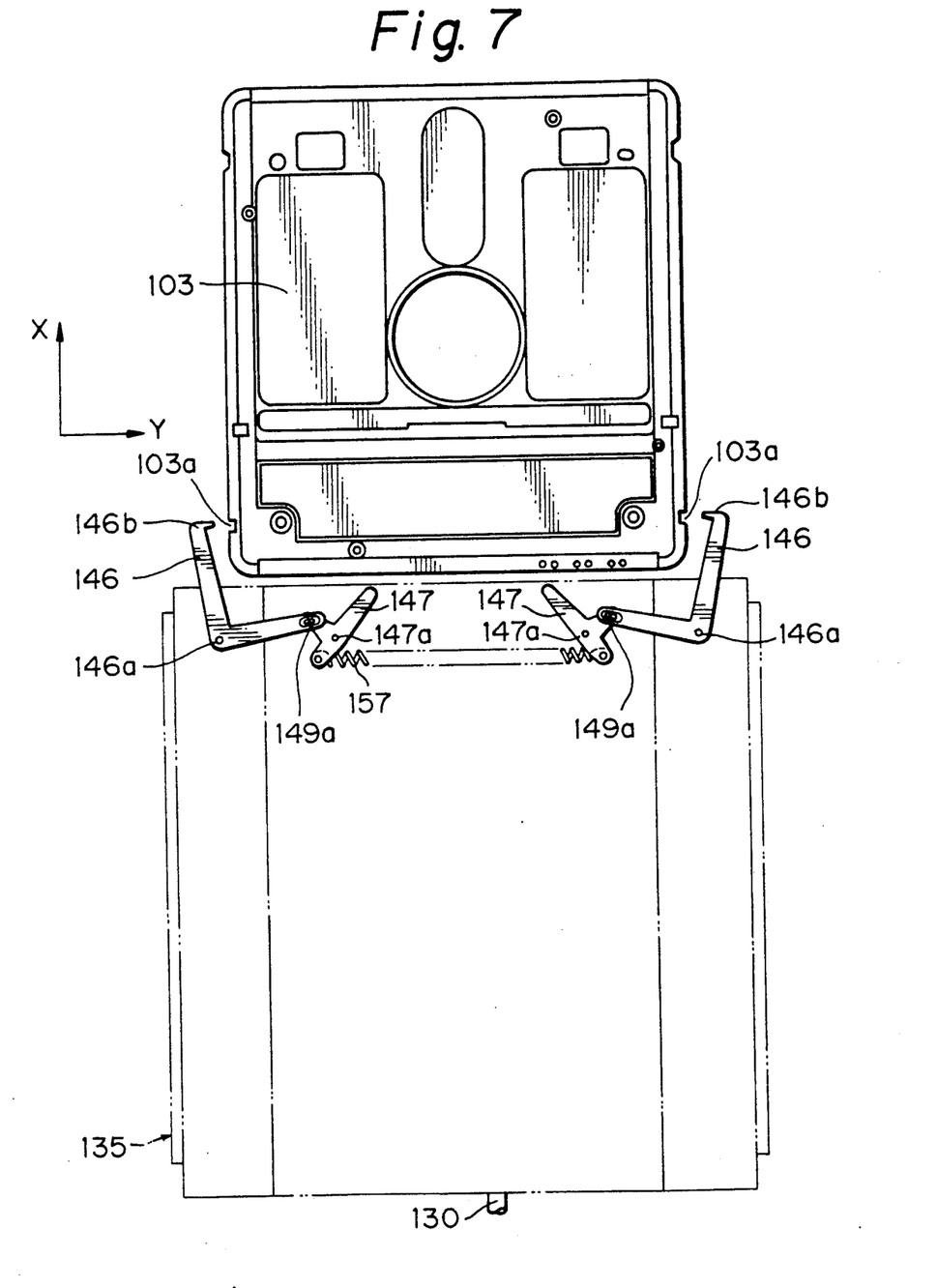
FIG. 7 is a plan view of a pair of gripper arms for gripping a cartridge.

As shown in FIGS. 5 through 7, a rectangular rotatable body 135 is attached to the free end of the spindle 130 for rotation with the spindle 130 in the direction of the arrow Q shown in FIG. 3. As shown in FIGS. 3, 4, and 5, the rectangular rotatable body 135 comprises front and rear side members 136, 137 as the front and rear sides of the rectangular shape, lefthand and righthand side members 138, 139 as the lefthand and righthand sides of the rectangular shape, and two front and rear pairs of upper and lower guide plates 140, 141 disposed on the upper and lower surfaces of the lefthand and righthand members 138, 139.

A movable chassis 143 is mounted on the rotatable body 135 for movement in lateral directions (the direction of the arrow X and the direction opposite thereto). More specifically, the front and rear side members 136, 137 have guide grooves defined in and extending the full length of the inner side surfaces thereof. A pair of front and rear sliders 144 is slidably fitted in the guide grooves, and the movable chassis 143 is attached to the sliders 144.

A pair of L-shaped gripper arms 146 is swingably mounted on the opposite ends of the movable chassis 143 by means of pins 146a extending vertically (in the direction of the arrow Z and the direction opposite thereto). The gripper arms 146 are swingable in a horizontal plane including the direction of the arrow X and the direction of the arrow Y. The gripper arms 146 serve to grip a cartridge 103. As shown in FIG. 4, the gripper arms 146 have hooks 146b, respectively, for engaging in recesses 103a defined in the cartridge 103. A pair of pusher arms 147 is swingably mounted on the movable chassis 143 by means of pins 147a. The pusher arms 147 are swingable in a plane parallel to the plane in which the gripper arms 146 are swingable. The pusher arms 147 serve to push an end of the cartridge 103.

As illustrated in FIGS. 4 and 5, a movable plate 149 is movably mounted on the rotatable body 135 above the movable chassis 143, the movable plate 149 being reciprocally movable in the same direction as the direction in which the movable chassis is movable. More specifically, a pair of front and rear sliders 150 is slidably held in engagement with the two upper guide plates 140 of the rotatable body 135, and the opposite ends of the movable plate 149 are fixed to the respective sliders 150. A spindle 151 is rotatably mounted on the movable plate 149 and extends in the Y direction of the apparatus, with two pinions 152 being fitted over the opposite ends of the spindle 151. The pinions 152 are in mesh with racks 153, respectively, disposed along the front and rear side members 136, 137. A worm wheel 155 is fitted over an intermediate portion of the spindle 151 and held in mesh with a worm 156a fixed to the output shaft of a motor 156 mounted on the movable plate 149. Therefore, when the motor 156 is energized, the pinions 152 roll on the racks 153 for thereby moving the movable plate 149 reciprocally in the lateral directions (the direction of the arrow X and the direction opposite thereto). A pair of front and rear pins 149a projects from the lower surface of the movable plate 149. The pins 149a are inserted in slots defined in free ends of the gripper arms 146 and the pusher arms 147. Therefore, when the movable plate 149 moves, the gripper arms 146 and the pusher arms 147 are caused to swing. A coil spring 157 is coupled to free ends of the pusher arms 147 for normally urging the gripper arms 146 and the pusher arms 147 in the directions of the arrows S, T (FIG. 4), respectively. Stopper pins 159 project on the movable chassis 143 for engaging the gripper arms 146 for limiting swinging movement (in the directions of the arrows S, T) the gripper arms 146 and the pusher arms 147 to angular positions shown in FIG. 4.

The movable plate 149, the sliders 150, spindle 151, the pinions 152, the racks 153, the worm wheel 155, the motor 156 including the worm 156a, and the stopper pins 159 jointly constitute a movable chassis driving means for moving the movable chassis 143 with respect to the rotatable body 135 and the base 110. The movable chassis driving means moves the movable chassis 143 through the gripper arms 146 and the pusher arms 147 under the resiliency of the coil spring 157. Therefore, a gripper arm mechanism composed of the gripper arms 146 and the pusher arms 147 is given a driving force by the movable chassis driving means.

The movable chassis driving means, the gripper arm mechanism, the movable chassis 143, the rotatable body 135, and a rotatable body driving means composed of the bearing 129, the spindle 130, and the motor 131 for rotating the rotatable body 135 jointly constitute a disc holding/reversing means for gripping, or holding, and reversing a disc together with its storage cartridge 103. The disc holding/reversing means, the base 110, and a base driving means including the motor 113 jointly constitute a disc draw/feed mechanism for successively selecting desired discs stored in the storage rack 104, and hence cartridges 103 and feeding them, one at a time, into the playback position, or for returning the discs, one at a time, from the playback position into the storage rack 104.

As shown in FIG. 3, a plurality of detector levers 161 are disposed alongside of the storage rack 104 in alignment with respective cartridge insertion levels or spaces in the storage rack 104. On a free end of each of the detector levers 161, there is mounted a detector switch (not shown) for detecting whether there is a cartridge by engaging a leading end of the cartridge which is inserted into one of the cartridge insertion levels.

As shown in FIG. 3, an address plate 162 is disposed near the counterweight 117 and extends along the direction in which the discs are arrayed in the storage rack 104, i.e., the direction in which the base 110 is movable.

Figure 8:
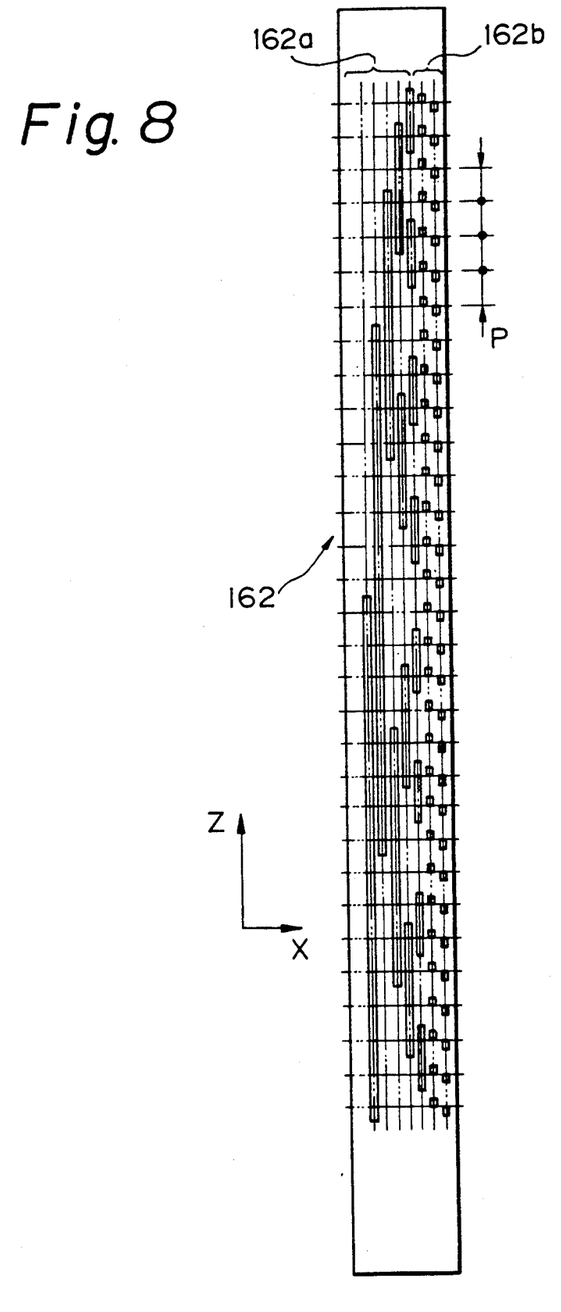
FIG. 8 is an elevational view of an address plate.
Figure 9:
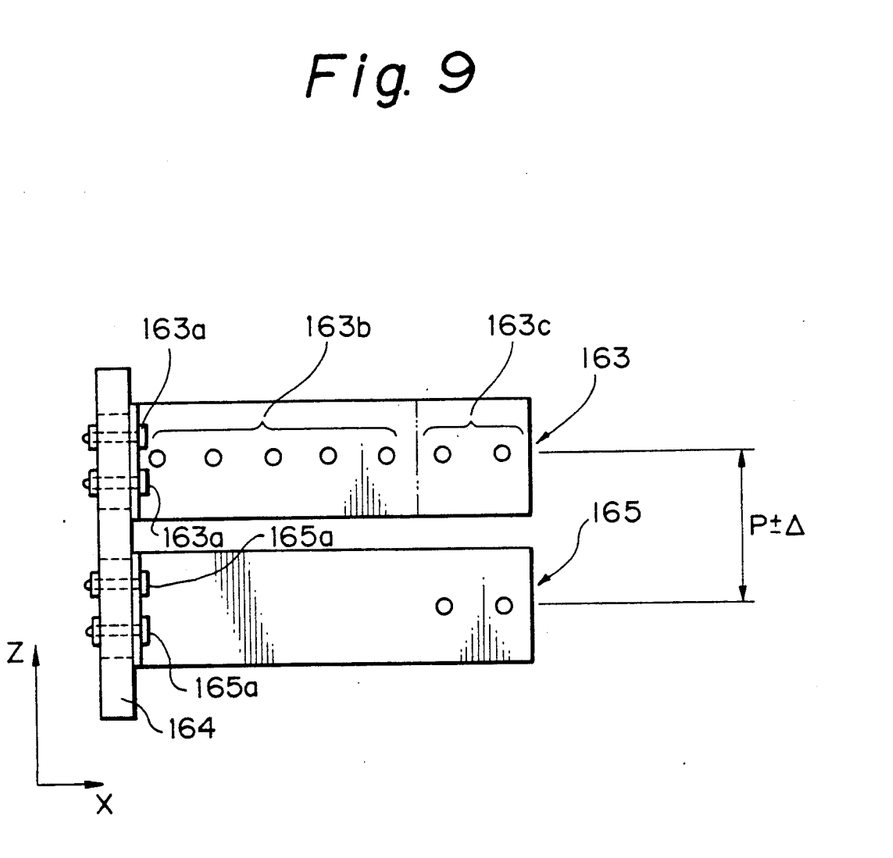
FIG. 9 is an elevational view of photosensors.

As shown in FIG. 8, the address plate 162 has an absolute address slit group 162a as an absolute address code group for indicating the disc storage positions in the storage rack 104 in 5 bits, and a positioning slit group 162b as a positioning indicia group for accurately indicating the positions of the discs stored in the disc storage positions, the slit groups 162a, 162b extending parallel to each other in the direction in which the base 110 is movable. As illustrated in FIGS. 3 and 9, a photosensor carrier 163 is mounted on a lefthand end of the base 110 through a bracket 164 by screw 163a, the photosensor carrier 163 being positioned over the address plate 162. The photosensor carrier 163 can be positionally adjusted in the longitudinal direction of the address plate 162 by loosening the screws 163a. As shown in FIG. 9, the photosensor carrier 163 carries thereon a linear array of seven photocouplers 163b and 163c. Five of the photocouplers 163b as counted from lefthand end (FIG. 9), serve as a reading means for reading the absolute address slit group 162a on the address plate 162, and the remaining two photocouplers 163c serve to detect each slit pair of the positioning slit group 162b. Each of the photocouplers comprise a light-emitting element for emitting a light beam and a light detector element for detecting the light beam. The light-emitting element and the light detector element are disposed one on each side of the address plate 162 across its thickness. FIG. 9 only shows the light-emitting elements, for example, of the photocouplers.

Another photosensor carrier 165 is attached to the bracket 164 below the photosensor carrier 163 by means of screws 165a. The photosensor carrier 165 can be positionally adjusted with respect to the photosensor carrier 163 in the longitudinal direction of the address plate 162. The photosensor carrier 165 carries thereon two photocouplers which cooperate with the two photocouplers 163c in operating as a detecting means for detecting the positioning slit group 162b.

As illustrated in FIG. 8 the positioning slit group 162b for indicating the positions of the discs stored in the disc storage positions, respectively, comprises two slit rows extending parallel to each other in the direction in which the base 110 is movable. The lower edges of the slits of one of the slit rows are horizontally aligned with the upper edges of the adjacent slits of the other slit row. When the central optical axes of the photocouplers of the photosensors 163, 165 for detecting the positioning slit group 162b are substantially aligned with the upper and lower edges of slits. i.e., when the output levels of the two photocouplers of the carrier 163 or 165 simultaneously are equal to each other, it is determined that the base 110 has reached a desired position and the motor 113 is deenergized.

Figure 10:
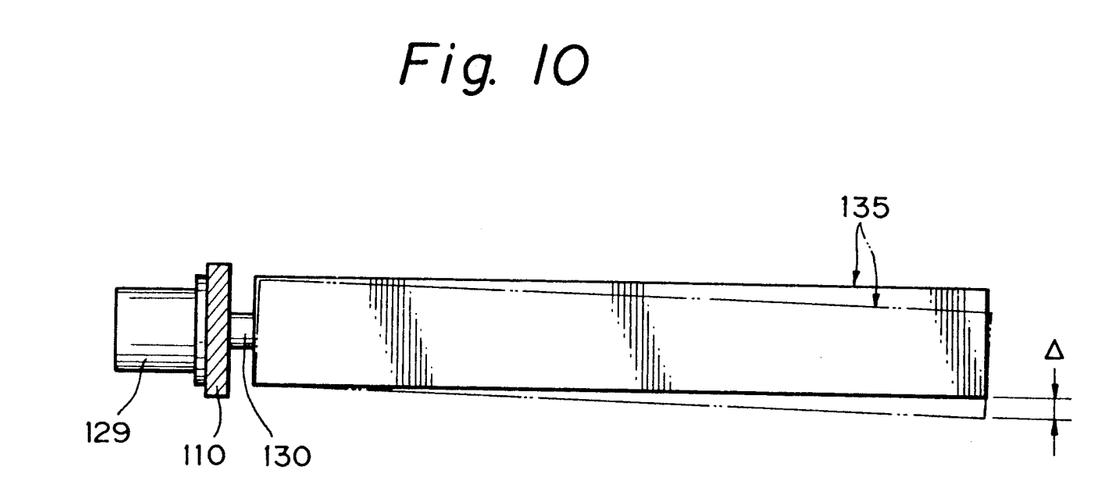
FIG. 10 is a view explaining how the rotatable body is displaced when turned around.

As shown in FIG. 10, when the rotatable body 135 is turned around or reversed together with the spindle 130 for playing both sides of a disk, the free end of the rotatable body 135 tends to be displaced by the deviation Δ due for example to an error in parallelism between the rotatable body 135 and the spindle 130 and dimensional errors of these parts. The photosensor carrier 165 is provided for correcting the deviation Δ. More specifically, for transferring a disc between the storage rack 104 and the rotatable body 135 with the "side A" of the disc facing upwardly (in the direction of the arrow Z), the photosensor 163 is positionally adjusted to establish its relative position with respect to the absolute address slit group 162a and the positioning slit group 162b. Then, in order to compensate for the deviation Δ produced when the disc is reversed for transferring the disc with the "side B" up, the photosensor carrier 165 is positionally adjusted to establish its relative position with respect to the positioning slit group 162b. When the "side A" of the disc is to be played back, the absolute address slit group 162a and the positioning slit group 162b are detected by the photocouplers 163b, 163c of the photosensor carrier 163 only. When the "side B" of the disc is to be played back, the absolute address slit group 162a is detected by the five photocouplers 163b of the photosensor carrier 163, while the positioning slit group 162b is detected by the photocouplers of the photosensor carrier 165. Therefore, as shown in FIGS. 3 and 9, the distance between the central optical axes of the photocouplers of the photosensor carriers 163, 165 becomes P±Δ which is the sum of the pitch P at which the discs are stored in the storage rack 104 and the deviation ±Δ.

The absolute address slit group 162a, the positioning slit group 162b, the photosensor carrier 163 and the photosensor carrier 165 jointly constitute a position detecting means for detecting when the base 110 has reached a position in which the disc holding/reversing means can hold a selected disc together with its storage cartridge 103, so that the base 110 can be stopped.

As shown in FIG. 4, detector switches 167, 168 are mounted on the lateral opposite ends of the rotatable body 135. The detector switches 167, 168 are engageable with the movable plate 149 to detect when the movable plate 149 has reached a limit for its movement.

Operation of the disc playback apparatus with automatic change will now be briefly described below.

When a disk to be played back is specified, the motor 113 is energized to move the base 110 to a position where the gripper arm mechanism can grip the cartridge storing the specified disc. Then, the motor 156 is energized to start moving the movable chassis 143 to the left (in the direction of the arrow X) together with the movable plate 149. The movable chassis 143 continuously moves until it abuts against stopper pins 154b (FIG. 4) projecting on the rotatable body 135 near its lefthand end, whereupon the movable chassis 143 is stopped. Thereafter, only the movable plate 149 is driven to move further to the left, and the gripper arms 146 and the pusher arms 147 are pushed by the pins 149a on the movable plate 149 so as to swing as shown in FIG. 7. The hooks 146b of the gripper arms 146 can now engage in the recesses 103a, respectively, defined in the side edges of the cartridge 103. The above process is then substantially reversed to pull the cartridge 103 out of the storage rack 104 into the cartridge playback means 107 for playback.

Upon completion of the playback, the cartridge 103 is returned into the storage rack 104 by a process which is a reversal of the process described above. The above operation is repeated for each disc that has been specified. In the above embodiment, the positions of the discs in the storage rack 104 and the absolute addresses of those positions are indicated by the slit groups on the address plate, and these slit groups are read by the photocouplers. However, these disc positions and their absolute addresses may be indicated by optical patterns or marks that can be detected by the photocouplers, rather than by the slits.

As described above in detail, the disc playback apparatus with automatic changer according to the present invention, includes the base movable in the direction in which discs are arrayed in the disc storage unit, the disc gripping/reversing means mounted on the base for movement in a direction substantially normal to the direction in which the discs are arrayed in the disc storage unit, for gripping and reversing a selected disc with the gripper arms, and the position detecting means for detecting when the base has reached a position where the selected disc can be gripped by the disc gripping/reversing means, thereby to stop the base. The position detecting means comprises the positioning indicia group having positioning indicia arranged along the direction in which the base is movable and aligned respectively with the disc storage positions, the absolute address code group disposed parallel to the positioning indicia group and indicating the addresses of the positioning indicia, the reading means for reading the absolute address code group, and the detecting means for detecting the positioning indicia. The detecting means comprises the two detectors disposed respectively for nonreversed and reversed conditions of the disc holding/reversing means.

More specifically, for transferring a disc with the "side A", for example, facing upwardly between the disc storage unit and the disc gripping/reversing means in an assembling process, the absolute address code group, the positioning indicia group, one of the two detectors, and the reading means are relatively positioned. Then, in order to compensate for a deviation Δ of the rotatable assembly including the gripper arms, which is produced in the direction in which the discs are arrayed when the disc is reversed for transferring the disc with the "side B" facing upwardly, the positioning indicia group and the other detector are relatively positioned. Since the positions of the discs are detected on the basis of the above relative positioning process, discs can be picked up and stored properly.

Therefore, the discs can be taken out of and into the disc storage unit reliably without fail even under insufficient dimensional and assembling accuracy of the components of the mechanism which feeds the discs. Since the detectors or photocouplers which are required in addition to the parts of the conventioal disc playback apparatus with automatic changer are inexpensive, the cost of the disc playback apparatus of the present invention is low.

Although a certain preferred embodiment has been shown and described, it should be understood that many changes and modifications may be made therein without departing from the scope of the appended claims.

I claim:

1. A disc recording/playback apparatus with an automatic changer, comprising a storage unit for storing a plurality of discs each at a disc storage position in said storage unit, each of said discs having first and second sides containing information, disc recording/playback means, and a disc withdraw/feed mechanism for selecting a disc from said storage unit and feeding a disc to said storage unit or said recording/playback means, said disc withdraw/feed mechanism having a base movable along a first direction parallel to a direction in which the discs are arrayed in said storage unit, base driving means for driving said base along said first direction, disc retrieving/rotating means mounted on said base for movement along a second direction substantially normal to said first direction for retrieving and holding a selected disc and rotatable about 180° between first and second positions for rotating said selected disc to feed said selected disc to said disc recording/playback means for accessing said first side or said second side of said selected disc, respectively, and position detecting means for detecting that said base has been moved to a position where the selected disc can be retrieved by said disc retrieving/rotating means, said position detecting means comprising a positioning indicia group having positioning indicia arranged along said first direction in which said base is movable and aligned respectively with said disc storage positions in said storage unit, an absolute address code group disposed parallel to said positioning indicia group and including a plurality of address code patterns respectively indicating addresses of said positioning indicia, reading means mounted for movement with said base for reading said absolute address code group, and first and second detection means, said reading means and said first detection means detecting said absolute address code group and said positioning indicia group, respectively, when said disc retrieving/rotating means is in said first position, and said reading means and said second detection means detecting said absolute address code group and said positioning indicia group, respectively, when said disc retrieving/rotating means is in said second position for maintaining said disc retrieving/rotating means in said first and second positions thereof in proper alignment with each of said disc storage positions when said base is moved to each of said disc storage positions for retrieving or replacing a disc and with said disc recording/playback means when said base is moved to said disc recording/playback means.

2. A disc recording/playback apparatus according to claim 1, wherein said absolute address code group comprises optical patterns, said reading means comprising photocouplers.

3. A disc recording/playback apparatus according to claim 2, wherein said absolute address code group comprises slits.

4. A disc recording/playback apparatus according to claim 1, wherein said positioning indicia comprise a pair of marks, and wherein each of said first and second detection means comprises a pair of photocouplers disposed in corresponding relation to said marks, respectively.

5. A disc recording/playback apparatus according to claim 4, wherein said marks are made of a plurality of slits.

6. A disc recording/playback apparatus according to claim 1, in which the positions of said first and second detection means are adjustable with respect to said base.

7. A disc recording/playback apparatus according to claim 2, wherein said positioning indicia comprise a pair of marks, and said first and second detection means comprising photocouplers disposed in corresponding relation to said marks, respectively.

8. A disc recording/playback apparatus according to claim 3, wherein said positioning indicia comprise a pair of marks, and said first and second detection means comprising photocouplers disposed in corresponding relation to said marks, respectively.

9. The disc recording/playback apparatus of claim 1, and further comprising a bracket connected to and movable with said base, and having first and second support structures extending perpendicular therefrom, said first support structure supporting said reading means and said first detection means, said second support structure supporting said second detection means, and said first and second support structures being parallel to each other.

10. The disc recording/playback apparatus of claim 9, wherein said first and second support structures are adjustably attached to said bracket.

11. The disc recording/playback apparatus of claim 10, and further comprising first and second sets of screws for adjusting the positions of said first and second support structure on said bracket in said first direction in which said base is movable.

12. A disc recording/playback apparatus with an automatic changer comprising:
a storage unit for storing a plurality of discs each at a disc storage position in said storage unit, each of said discs having first and second sides containing information;
disc recording/playback means; and
a disc withdraw/feed mechanism for selecting a disc from said storage unit and feeding a disc to said storage unit or said disc recording/playback means, said disc withdraw/feed mechanism comprising:
a base movable along a first direction parallel to a direction in which the discs are arrayed in said storage unit;
base driving means for driving said base along said first direction;
disc retrieving/rotating means mounted on said base for movement along a second direction substantially normal to said first direction for retrieving and holding a selected disc and rotatable about 180° between first and second positions for rotating said selected disc to feed said selected disc to said disc recording/playback means for accessing said first side or said second side of said selected disc, respectively;
position detecting means for detecting that said base has been moved to a position where the selected disc can be retrieved by said disc retrieving/rotating means, said position detecting means including a positioning indicia group having positioning indicia arranged along said first direction in which said base is movable and aligned respectively with said disc storage positions in said storage unit, an absolute address code group disposed parallel to said positioning indicia group and including a plurality of address code patterns respectively indicating addresses of said positioning indicia;
reading means mounted for movement with said base for reading said absolute address code group; and
first and second detection means;
said reading means and said first detection means detecting said absolute address code group and said positioning indicia group, respectively, when said disc retrieving/rotating means is in said first position, and said reading means and said second detection means detecting said absolute address code group and said positioning indicia group, respectively, when said disc retrieving/rotating means is in said second position for maintaining said disc retrieving/rotating means in said first and second positions thereof in proper alignment with each of said disc storage positions when said base is moved to each of said disc storage positions for retrieving or replacing a disc, and in proper alignment with said disc recording/playback means when said base is moved to said disc recording/playback means.

* * * * *